US 9,438,384 B2

(12) United States Patent
Wentink

(10) Patent No.: US 9,438,384 B2
(45) Date of Patent: Sep. 6, 2016

(54) PROVIDING MULTIPLE RETRANSMISSION POLICIES FOR A SINGLE DATA STREAM BY MAPPING DIFFERENTIATED SERVICES CODE POINT (DSCP) BIT FIELDS TO MEDIA ACCESS CONTROL PROTOCOL DATA UNIT (MPDU) BIT FIELDS

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 13/043,202

(22) Filed: Mar. 8, 2011

(65) Prior Publication Data

US 2012/0230200 A1 Sep. 13, 2012

(51) Int. Cl.
*H04L 1/18* (2006.01)

(52) U.S. Cl.
CPC ........... *H04L 1/1877* (2013.01); *H04L 1/1825* (2013.01); *H04L 1/1887* (2013.01); *H04L 1/1896* (2013.01)

(58) Field of Classification Search
CPC ........ H04L 12/26; H04L 9/00; H04W 36/00; H04W 72/04; H04W 84/02; G06F 15/16
See application file for complete search history.

(56) References Cited

U.S. PATENT DOCUMENTS

| 8,554,231 | B2 * | 10/2013 | Jones ............................. 455/439 |
| 2005/0135291 | A1 * | 6/2005 | Ketchum et al. ............. 370/319 |
| 2005/0195858 | A1 | 9/2005 | Nishibayashi et al. |
| 2005/0238054 | A1 * | 10/2005 | Sharma ......................... 370/473 |
| 2006/0021879 | A1 * | 2/2006 | Lin et al. ....................... 205/109 |
| 2006/0092871 | A1 * | 5/2006 | Nishibayashi et al. ........ 370/328 |
| 2006/0150050 | A1 * | 7/2006 | Choi et al. ..................... 714/748 |
| 2006/0168133 | A1 | 7/2006 | Park et al. |
| 2006/0190610 | A1 * | 8/2006 | Motegi et al. ................. 709/228 |
| 2006/0221879 | A1 * | 10/2006 | Nakajima et al. ............. 370/310 |
| 2008/0049695 | A1 | 2/2008 | Ogura |

(Continued)

FOREIGN PATENT DOCUMENTS

| CN | 1744485 A | 3/2006 |
| CN | 1815943 A | 8/2006 |

(Continued)

OTHER PUBLICATIONS

International Search Report and Written Opinion—PCT/US2012/027901—ISA/EPO—Apr. 13, 2012.

*Primary Examiner* — Andrew Lai
*Assistant Examiner* — Leon Andrews
(74) *Attorney, Agent, or Firm* — Kevin T. Cheatham

(57) ABSTRACT

One feature provides for a method operational at an access point in communication with a destination station where the access point receives a stream of data including at least one media access control protocol data unit (MPDU) having a Differentiated Services Code Point (DSCP) field value, provides a retransmission policy to the MPDU based on the DSCP field value, and transmits the MPDU to the destination station via a wireless local area network. The stream of data may include a stream of video data having a layered modulation scheme, where the DSCP field value identifies at least one layer of the layered modulation scheme. The access point may use deep packet inspection to retrieve the DSCP value from the MPDU. In this fashion, multiple retransmission policies may be provided for a single data stream by mapping DSCP field values to MPDU bit fields, such as the Traffic Identifier field.

36 Claims, 18 Drawing Sheets

(56) References Cited

U.S. PATENT DOCUMENTS

| | | |
|---|---|---|
| 2009/0235066 A1* | 9/2009 | Ptasinski et al. ............. 713/150 |
| 2009/0259910 A1 | 10/2009 | Lee et al. |
| 2009/0268707 A1 | 10/2009 | Pani et al. |
| 2010/0030912 A1* | 2/2010 | Finkenzeller et al. ........ 709/233 |
| 2010/0189056 A1* | 7/2010 | Nishibayashi et al. ....... 370/329 |
| 2014/0185482 A1* | 7/2014 | Jackowski et al. ........... 370/252 |

FOREIGN PATENT DOCUMENTS

| | | |
|---|---|---|
| CN | 101959162 A | 1/2011 |
| JP | 2003324445 A | 11/2003 |
| JP | 2006166453 A | 6/2006 |
| JP | 2006217085 A | 8/2006 |
| JP | 2006287550 A | 10/2006 |
| JP | 2007151171 A | 6/2007 |
| JP | 2007281754 A | 10/2007 |
| JP | 2008294605 A | 12/2008 |
| JP | 2010028378 A | 2/2010 |
| JP | 2010050694 A | 3/2010 |
| WO | WO2004042993 | 5/2004 |
| WO | WO-2008139842 A1 | 11/2008 |
| WO | WO2009045840 A2 | 4/2009 |

\* cited by examiner

| TID Value | Usage | Access Policy |
|---|---|---|
| 0 - 7 | User Priority | EDCA |
| 8 - 15 | Traffic Stream Identifier | HCCA |

| DSCP | TID 4 | TID 5 |
|---|---|---|
| ⋮ | | |
| 24 | No ACK | Block Ack 0 Retries |
| 25 | Block Ack 2 Retries | Block Ack 5 Retries |
| 26 | No ACK | Block Ack 0 Retries |
| 27 | Block Ack 2 Retries | Block Ack 5 Retries |
| 28 | No ACK | Block Ack 0 Retries |
| ⋮ | | |

900

| TID | User Priority At Receiver | Access Category |
|---|---|---|
| 1 | 1 | AC_BK |
| 2 | 2 | AC_BK |
| 0 | 0 | AC_BE |
| 3 | 3 | AC_BE |
| 4 | 4 | AC_VI |
| 5 | 5 | AC_VI |
| 6 | 6 | AC_VO |
| 7 | 7 | AC_VO |
| 8 | 4 | AC_VI |
| 9 | 5 | AC_VI |
| 10 | 4 | AC_VI |
| 11 | 5 | AC_VI |
| 12 | 4 | AC_VI |
| 13 | 5 | AC_VI |
| 14 | 4 | AC_VI |
| 15 | 5 | AC_VI |

| Non-class Selector CP | Rewritten TID Value | Retransmission Policy | Access Category |
|---|---|---|---|
| ⋮ | | | |
| 12 | 7 | No ACK | AC_VI |
| 13 | 5 | Block ACK 2 Retries | AC_VI |
| 14 | 3 | Block ACK 4 Retries | AC_VO |
| 15 | 4 | Block ACK 10 Retries | AC_VO |
| 16 | 5 | Block ACK 2 Retries | AC_VI |
| ⋮ | | | |

FIG. 12

PROVIDING MULTIPLE RETRANSMISSION POLICIES FOR A SINGLE DATA STREAM BY MAPPING DIFFERENTIATED SERVICES CODE POINT (DSCP) BIT FIELDS TO MEDIA ACCESS CONTROL PROTOCOL DATA UNIT (MPDU) BIT FIELDS

BACKGROUND

1. Field

One feature generally relates to communication systems, and more particularly, to a method of providing multiple retransmission policies for different media access control protocol data units (MPDUs) within a single data stream.

2. Background

The increased availability of wireless local area networks (WLANs) has allowed stations, such as desktop computers, laptop computers, hand held personal digital assistants (PDAs), and mobile phones, to wirelessly connect with one another through a variety of networks, such as local area networks (LANs) and the Internet, to transfer data between them. For example, a user can take her laptop computer from her desk into a conference room to attend a meeting and still have access to her local network to retrieve data and have access to the Internet via one or more modems or gateways present on the local network without being tethered by a wired connection.

A WLAN may be comprised of four primary components. These components may include stations (STAs), access points (APs), a wireless medium and a distribution system. The network is built to transfer data between stations that may include computing devices with wireless network interfaces. For example, laptop computers, desktop computers, mobile phones, and other electronic devices having wireless network interfaces are examples of stations within a network. Access points are devices that allow stations to connect to one another and transfer data. Examples of access points include routers, centralized controllers, base stations, "node Bs," or site controllers.

Data is transmitted over a WLAN via packets. Packets contain control information and payload information (e.g., the data); the form of packets vary depending on the communication protocol. A station may desire to transfer multimedia content, such as video, over the WLAN to another station via one or more access points. Typically, video traffic is mapped to a single priority level, which means that all frames in the video stream will have the same retransmission policy on a WLAN link between an access point and the destination station (station receiving the video data). However, some video frames may contain more important information than other video frames, and thus frames with less important information may be dropped with less consequence than frames with more important information.

For example, in some content distribution systems, hierarchical modulation schemes (also referred to as layered modulation schemes) may be implemented to deliver varying quality or resolution of video content. Such schemes often modulate multiple data streams/bitstreams into one single symbol stream or bitstream, comprising base layer bitstream/symbols and enhancement layer bitstream/symbols before transmission. Use of the enhancement layer permits improving video content quality and/or resolution at the receiving device(s). The first base layer bitstream may include a plurality of intra-coded picture frames (I-frames) and predicted picture frames (P-frames). The first enhancement layer bitstream includes a plurality of bi-predictive picture frames (B-frames). In such a scheme, data pertaining to I-frames and P-frames are more critical than data pertaining to B-frames. Other content distribution systems may also have properties such that certain frame data is more critical than other frame data.

Therefore, there is a need for a method to provide multiple retransmission policies for different data frames within a data stream, such as a video and/or audio data stream having a layered modulating scheme, that has a single priority level link between an access point and a station.

SUMMARY

One feature provides for a method operational at an access point in communication with a destination station, where the method comprises: receiving a stream of data including at least one media access control protocol data unit (MPDU) having a Differentiated Services Code Point (DSCP) field value; providing a retransmission policy to the MPDU based on the DSCP field value; and transmitting the MPDU to the destination station via a wireless local area network (WLAN). In one embodiment, the stream of data includes a stream of video data having a layered modulation scheme, where the DSCP field value of the MPDU identifies at least one layer of the layered modulation scheme. In another embodiment, the retransmission policy identifies a maximum number of retransmissions of the MPDU to the destination station.

In one embodiment, the method further comprises: performing deep packet inspection to retrieve the DSCP field value of the MPDU and provide the retransmission policy to the MPDU. In another embodiment, the method further comprises: prioritizing the transmission of the MPDU to the destination station according to an Access Category value, where the Access Category value is based on an IP Precedence portion of the DSCP field value of the MPDU. In another embodiment, the method further comprises: providing the retransmission policy to the MPDU based on a Non-IP Precedence portion of the DSCP field value of the MPDU. In yet another embodiment, the method further comprises: determining that the DSCP field value of the MPDU is a Class Selector Code Point value; interpreting the Class Selector Code Point value as a User Priority value; prioritizing the transmission of the MPDU to the destination station according to an Access Category associated with the User Priority value; and providing the retransmission policy to the MPDU based on an IP Precedence portion of the DSCP field value of the MPDU.

In another embodiment, the method further comprises: determining that the DSCP field value of the MPDU is a Non-class Selector Code Point value; prioritizing the transmission of the MPDU to the destination station according to an Access Category value, the Access Category value selected based on the Non-class Selector Code Point value; and providing the retransmission policy to the MPDU based on the Non-class Selector Code Point value. In yet another embodiment, the method further comprises: determining that the DSCP field value of the MPDU is a Non-class Selector Code Point value; interpreting an IP Precedence portion of the DSCP field value as a User Priority value; prioritizing the transmission of the MPDU to the destination station according to an Access Category associated with the User Priority value; and providing the retransmission policy to the MPDU based on a Non-IP Precedence portion of the DSCP field value of the MPDU.

In another embodiment, the MPDU includes a first Traffic Identifier (TID) field value, and the method further comprises: replacing/rewriting the first TID field value of the MPDU with a second TID field value, wherein the second TID field value is based on the DSCP field value. In yet another embodiment, the second TID value determines the retransmission policy of the MPDU. In yet another embodiment, the second TID field value has a value between eight (8) and fifteen (15) when Hybrid Coordination Function Controlled Channel Access (HCCA) is disabled between the access point and the destination station. In another embodiment, the DSCP field value is associated with a Network Layer and the MPDU is associated with a Data Link Layer. In yet another embodiment, the DSCP field value is defined in a payload portion of the MPDU. In yet another embodiment, providing the retransmission policy to the MPDU based on the DSCP field value is defined on a per MPDU basis.

BRIEF DESCRIPTION OF THE DRAWINGS

FIG. 9 illustrates one example of an alternative mapping of TID subfield values and the User Priority values that correspond to the various priority based Access Categories according to one embodiment.

FIG. 12 illustrates a partial mapping between Non-Class Selector Code Point values, the Access Category value, and the TID value assigned/rewritten to an MPDU according to one embodiment.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may not be shown in detail in order not to obscure the embodiments.

Overview

Techniques are presented herein that allow for multiple retransmission policies for different Media Access Control Protocol Data Units (MPDUs) that comprise a stream of data (e.g., video and/or audio data streams) to be transmitted from a transmitter to a receiver. For example, one feature provides for a method operational at an access point in communication with a destination station via a wireless local area network where the access point receives a stream of data including at least one media access control protocol data unit (MPDU) having a Differentiated Services Code Point (DSCP) field value, provides a retransmission policy to the MPDU based on the DSCP field value, and transmits the MPDU to the destination station. The stream of data may include a stream of video data having a layered modulation scheme, where the DSCP field value identifies at least one layer of the layered modulation scheme. The access point may use deep packet inspection to retrieve the DSCP value from the MPDU. In this fashion, multiple retransmission policies may be provided for a single data stream by mapping DSCP field values to MPDU bit fields, such as the Traffic Identifier (TID) field.

Exemplary Network Environment

Figure 1:
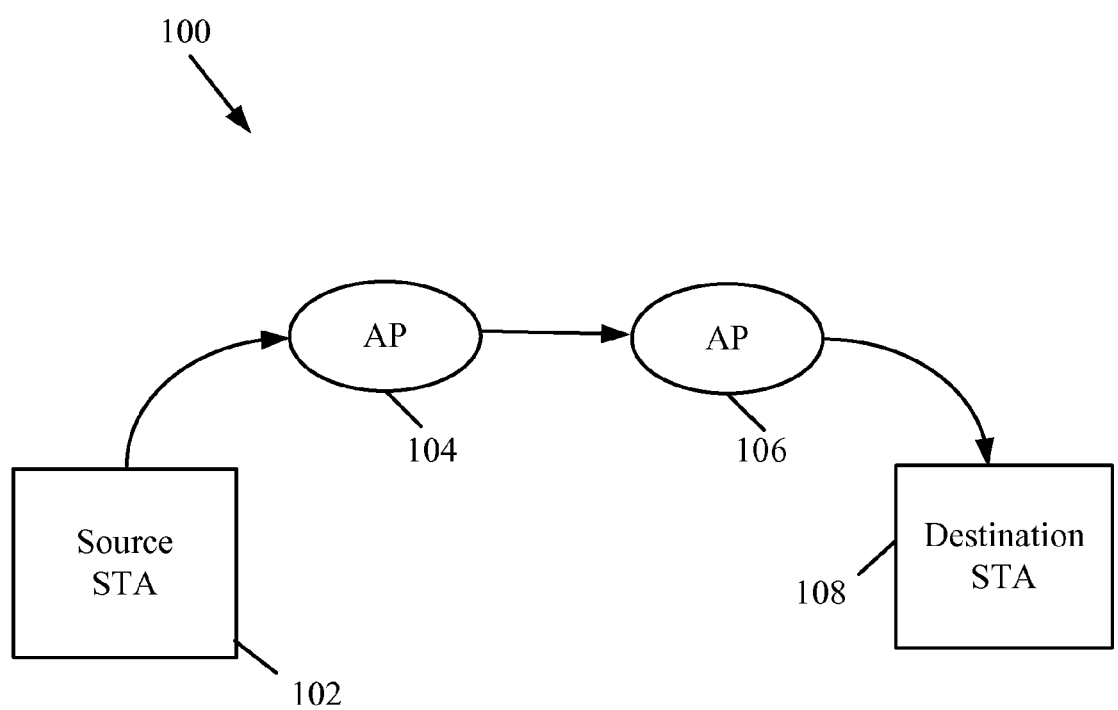
FIG. 1 illustrates one example of a wireless local area network (WLAN) environment where a source station desires to transmit data to a destination station through one or more access points according to one embodiment.

FIG. 1 illustrates an exemplary WLAN environment 100 where a source STA 102 desires to transmit data to a destination STA 108 through one or more access points 104, 106. In this example, the source STA 102 wishes to ultimately transmit, for example, video data frames to the destination STA 108, but in other embodiments the data transmitted may be of any type. The source STA 102 may communicate to a first access point 104 through a wireless connection. The first AP 104 in turn communicates through a wired or wireless connection to the second AP 106. The second AP 106 in turn communicates with the destination STA 108 through a wireless connection. In some embodiments, the source STA 102 and/or the destination STA 108 may have a wired connection with the access points 104, 106 instead of, or in addition to, a wireless connection. In other embodiments, one or more access points may exist between the source STA 102 and the destination STA 108.

Most wireless communication networks, including WLANs, may be broken down into different sections in order to help conceptualize the inner workings and structure of the network. For example, the Open Systems Interconnection model (OSI model) is a way of sub-dividing a communications system into smaller parts called layers. A "layer" is a collection of conceptually similar functions that provide services to the layer above it and receives services from the layer below it. On each layer an instance provides services to the instances at the layer above and requests service from the layer below. Embodiments presented herein for providing multiple retransmission policies for different MPDUs that comprise a stream of data transmitted from a source STA 102 to a destination STA 108 may be implemented and conceptualized within such a scheme.

Figure 2:
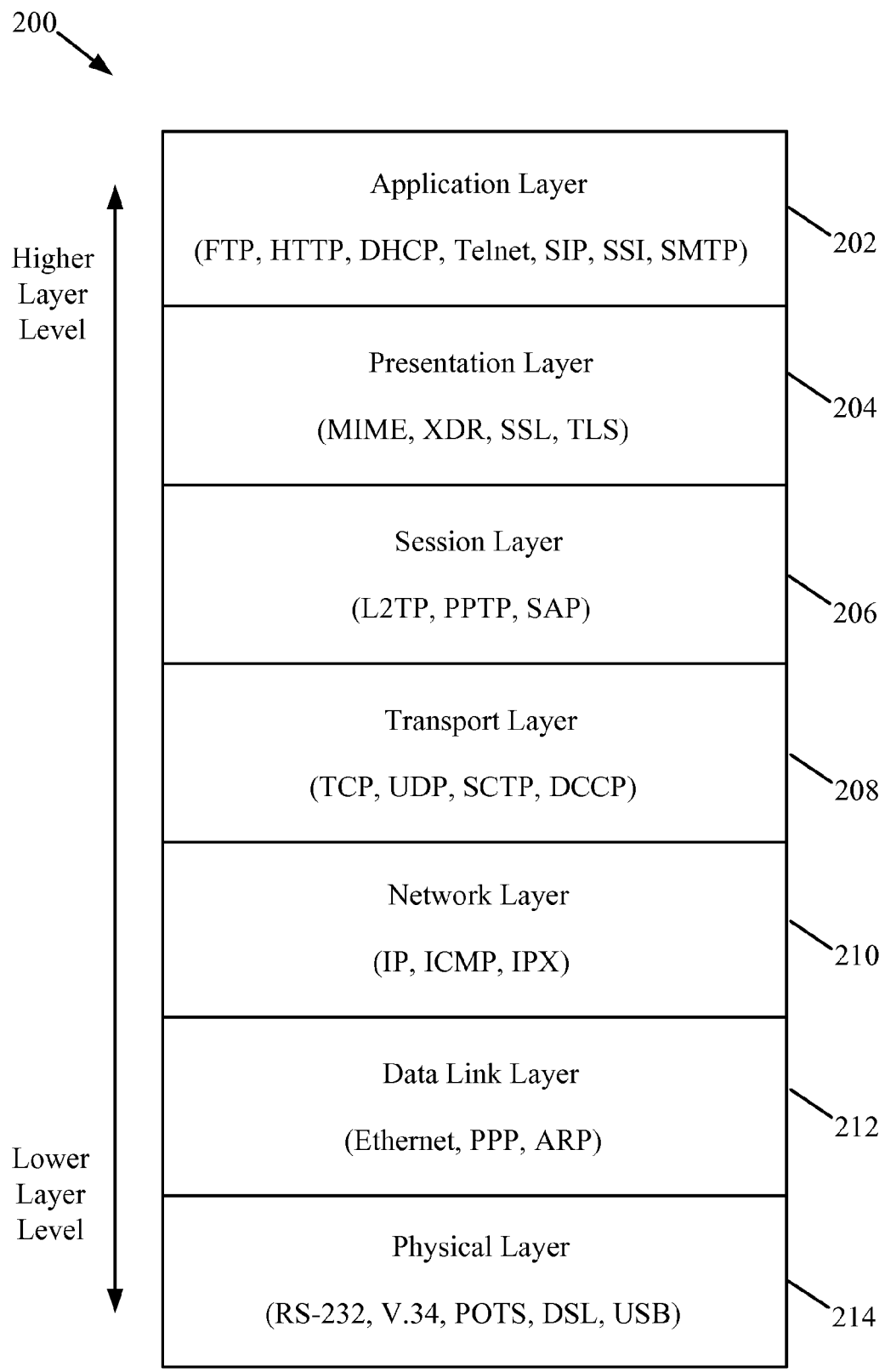
FIG. 2 illustrates one example of an Open Systems Interconnection (OSI) model having seven layers according to one embodiment.

FIG. 2 illustrates one example of an OSI model 200 illustrated by seven layers ranging from "highest" (i.e., conceptually closer to the user) to "lowest" (i.e., bottom level mechanics less noticeable to the user). The OSI model may comprise an Application layer 202 at the top, followed by a Presentation layer 204, Session layer 206, Transport layer 208, Network layer 210, Data Link layer 212, and a Physical layer 214.

Figure 3:
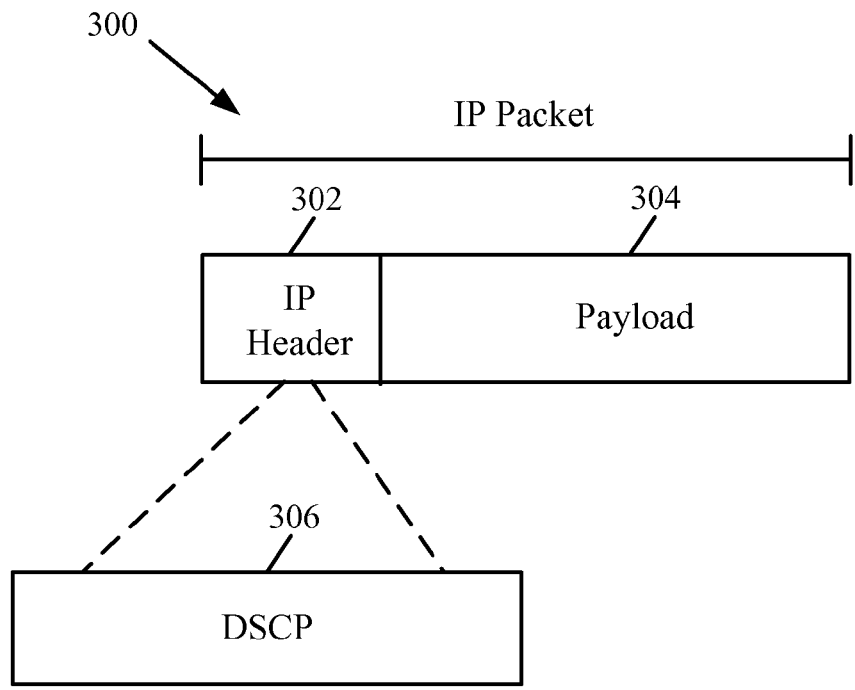
FIG. 3 illustrates one example of an Internet Protocol (IP) packet having an IP header and IP payload according to one embodiment.

The video data frames that are transmitted from the source STA 102 may be configured as Internet Protocol (IP) packets 300 at the network layer 210, as illustrated in FIG. 3. The IP packet 300 may comprise an IP header 302 and payload 304. The payload 304 contains video data that comprises a portion of the data stream that the source STA 102 desires to transmit to the destination STA 108. Among other things, the IP header 302 comprises a 6 bit Differentiated Services Code Point (DSCP) 306 field that serves to classify the type of data being transmitted at the network layer 210.

Differentiated Services (DiffServ) may be used to provide low-latency, guaranteed service to critical network traffic packet types, such as voice or video packets, while providing simple best-effort traffic guarantees to non-critical services, such as email or file transfers. For example, a packet having a DSCP value of 52 may be classified has having an "Expedited Forwarding" behavior, and such packets will be transmitted with low delay and low jitter, suitable for voice or video. By contrast, a DSCP value of 15 may have a higher drop rate and is given less priority than a packet having a value of 52.

Moreover, DSCP code values may be broken up into two categories: Class Selector Code Points and Non-class Selector Code Points. Class Selector Code Points correspond to DSCP values between 0-7, i.e., only the first three least significant bits of the six bit DSCP field 306 may be used. Non-class Selector Code Points correspond to DSCP values 8-63, where all six bits may be used. The "IP Precedence" portion of the DSCP field 306 corresponds to the three least significant bits of the DSCP field 306. As used herein, the "non-IP Precedence" portion of the DSCP field 306 corresponds to the three most significant bits of the DSCP field 306.

Figure 4:
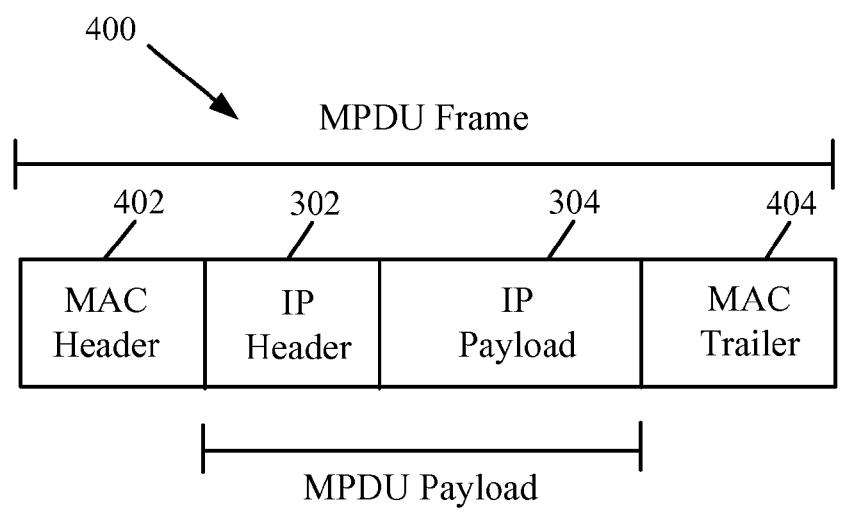
FIG. 4 illustrates a Media Access Control Protocol Data Unit (MPDU) comprising a Media Access Control (MAC) header and a MAC trailer, with an IP packet serving as the payload for the MPDU according to one embodiment.
Figures 5, 6:
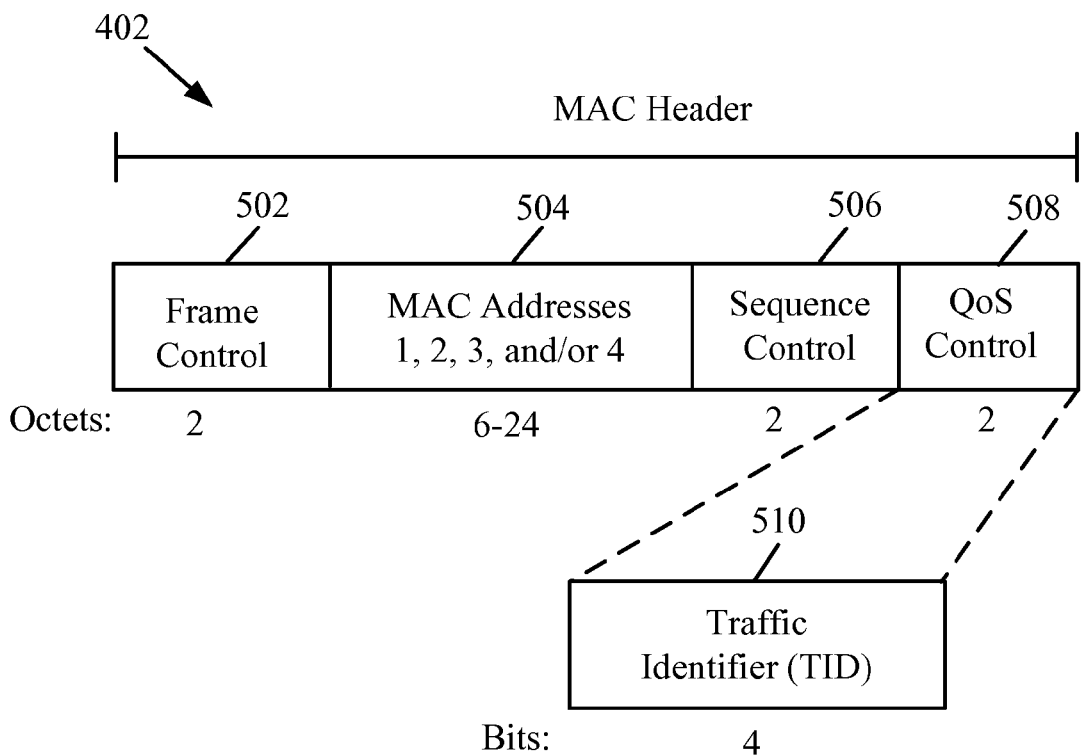
FIG. 5 illustrates bit fields that may comprise the MAC header, including the Frame Control field, MAC Address fields, Sequence Control field, and Quality of Service (QoS) field according to one embodiment.
FIG. 6 illustrates a table showing Traffic Identifier (TID) subfield values that correspond to User Priority (UP) values within an Enhanced Distributed Channel Access (EDCA) method of channel access, and the TID subfield values that correspond to Traffic Stream Identifier values within a Hybrid Coordination Function Controlled Channel Access (HCCA) method of channel access according to one embodiment.

The IP packets 300 may be further encapsulated as Media Access Control Protocol Data Units (MPDUs) or Media Access Control Service Data Units (MSDUs) at the Data Link layer 212. FIG. 4 illustrates an MPDU 400 comprising a MAC header 402 and a MAC trailer 404, with the IP packet 300 serving as the payload for the MPDU 400. Thus, the payload of the MPDU comprises, among other things, the IP header 302 and IP payload 304 where the IP header 302 includes the DSCP field 306 value. FIG. 5 illustrates some of the fields that may comprise the MAC header 402, including the Frame Control 502 field, MAC Address fields 504, Sequence Control field 506, and Quality of Service (QoS) field 508. The QoS field 508 may comprise a Traffic Identifier (TID) field 510. The Sequence Control field 506 contains a 12 bit Sequence Number field indicating the sequence number of the MPDU 400 assigned by a transmitting station. A receiving station can then reorder received MPDUs based on the sequence numbers.

Referring to the table 600 shown in FIG. 6, the TID field 510 is a 4 bit field where values 0-7 identify a User Priority (UP) value used to classify the priority given the MPDU 400 within an Enhanced Distributed Channel Access (EDCA) method of channel access. Values within the range of 8-15 are traditionally used when the access points 104, 106 within the WLAN 100 support Hybrid Coordination Function Controlled Channel Access (HCCA). Thus, if a WLAN 100 does not support HCCA, values 8-15 of the TIDs are not traditionally used and the WLAN 100 classifies the priority given MPDUs based on the User Priority Value. The levels of priority in EDCA are called access categories (AC) and the relationship between User Priority values and AC is shown in the mapping 700 illustrated in FIG. 7. Thus, UP values of 4 and 5 translate to an AC of video content (AC_VI), and UP values of 6 and 7 translate to an AC of voice content (AC_VO).

QoS STAs/APs maintain one modulo-4096 sequence number counter per TID value, per unique receiver (specified by the Address 1 field 504). Sequence numbers for QoS data frames such as MPDU 400 are assigned using the counter identified by the TID subfield 510 of the QoS Control field 508, and that counter is incremented by one for each MPDU belonging to that TID value.

Typically, a stream of video data transmitted from the source STA 102 to the destination STA 108 may comprise a stream of MPDUs that substantially has a single TID User Priority value of, for example, 5. Such a stream of video data may therefore have the same retransmission policy for each MPDU 400 transmitted from the sender(s) (e.g., source STA 102 and/or e.g., second AP 106) to the receiver(s) (e.g., first AP 104, second AP 106, and/or destination STA 108) regardless of the relative importance of any one particular MPDU. This is because 802.11n devices typically utilize a Block Acknowledgement (ACK) retransmission policy that is set up per TID value. Thus, all MPDUs transmitted with the same TID get transmitted under the same Block ACK policy without differentiation.

However, since some MPDUs may be associated with video frames, for example "I-frames," that are more important than other MPDUs associated with less important video frames, such as "B-frames," the source STA 102 may desire to establish different retransmission policies for different MPDUs. For example, the source STA 102 may desire to implement a Block Ack with a 10 retry retransmission policy for MPDUs associated with I-frames, and a No Ack retransmission policy for MPDUs associated with B-frames. Generally however, the source STA 102 and/or Access Point 106 may desire the flexibility to assign a different retransmission policy to any MPDU within the stream of data transmitted to the destination STA 108. In one embodiment, it may be assumed that I-frames and B-frames are carried in different MPDUs and/or IP packets. However, in some embodiments it is not required that each MPDU and/or IP packet carry exactly one I-frame or B-frame, or that each MPDU and/or IP packet carry an integer multiple of I-frames or B-frames. I-frames and B-frames can be partly included in any one MPDU and/or IP packet.

Thus, among other things, embodiments are disclosed herein that allow for multiple retransmission policies for different MPDUs that comprise a stream of data (e.g., video and/or audio data streams) transmitted from transmitter to a receiver. In some embodiments the transmitter may be either the source STA 102, first AP 104, and/or second AP 106. In some embodiments the receiver may be the first AP 104, the second AP 106, and/or the destination STA 108.

Figure 7:
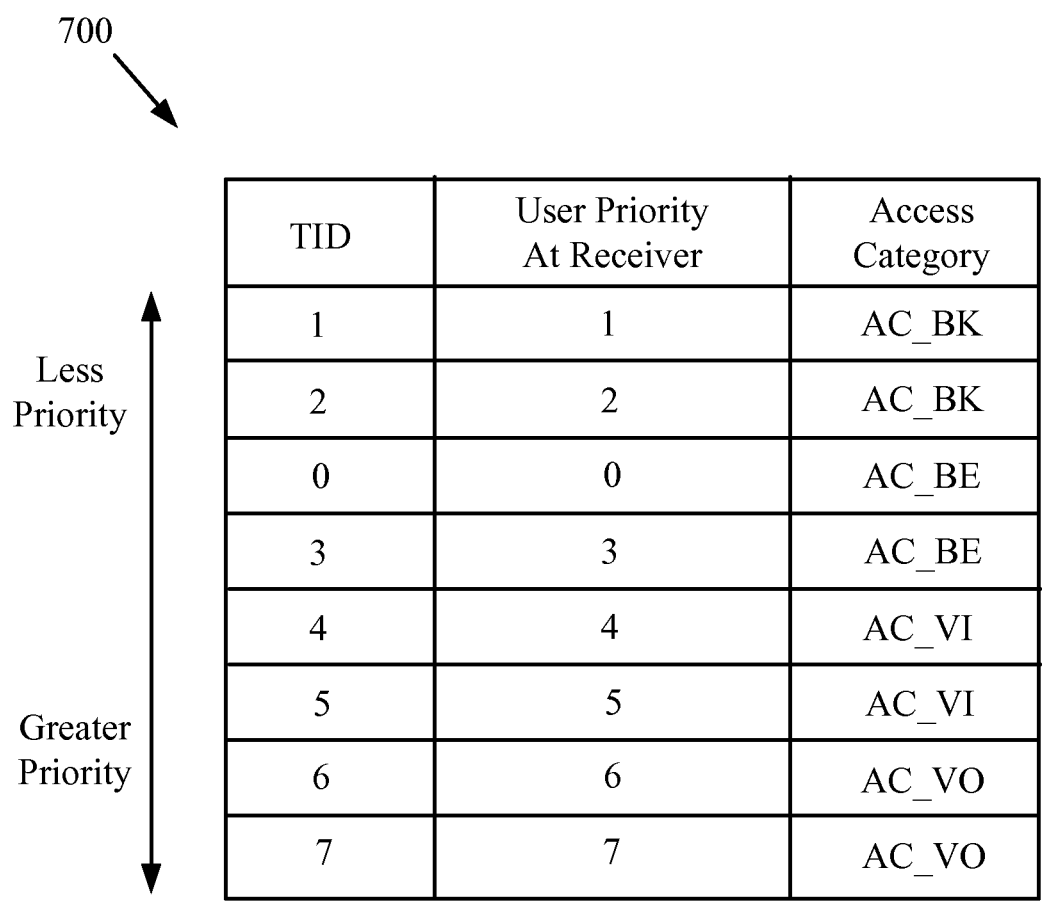
FIG. 7 illustrates a mapping of the Traffic Identifier subfield values and the User Priority values that correspond to the various priority based Access Categories according to one embodiment.

In one embodiment, the source STA 102 desires to transmit video and/or audio data streams to the destination STA 108 using either EDCA or HCCA. The source STA 102 may assign each MPDU 400 comprising the data stream one of two TID field 510 values: TID 4 or TID 5. TID values 4 and 5 correspond to User Priority values 4 and 5, respectively, and as illustrated in FIG. 7, the Access Category that corresponds and is associated to these values is AC_VI. Thus, in this embodiment, a one-to-one, fixed relationship exists between the TID 510 value of the MPDU 400 and the User Priority and Access Category assigned to that MPDU 400.

Multiple retransmission policies for each MPDU 400 can then be realized by assigning different values to the DSCP field 306 within the IP header 302. As discussed herein, Differentiated Services (DiffServ) is a computer networking architecture that specifies a mechanism for classifying network traffic and providing Quality of Service guarantees on IP networks. DiffServ uses the 6-bit DSCP field 306 in the IP header 302 for packet classification purposes. Moreover, in one embodiment, the DSCP values may be used by the transmitter and receiver to designate different retransmission policies. The transmitter and receiver may exchange—in advance—mapping information that designates a particular retransmission policy for each DSCP value. Moreover, the mapping information may designate a particular retransmission policy for each DSCP value within the IP header per TID value in the MAC header of the MPDU.

Thus, the source STA 102, and/or an application generating the data stream, may manipulate the DSCP field 306 value and the TID field 510 value for each MPDU 400 to select a specific retransmission policy for that MPDU 400 based on a preset mapping between the transmitter and receiver. Similarly, the receiver may read the DSCP field 306 value of each MPDU 400 received (e.g., by deep packet inspection) and the TID field 510 value and handle the MPDU's 400 retransmission policy accordingly.

Figure 8:
FIG. 8 illustrates a partial mapping of retransmission policies, TID values, and DSCP values between a transmitter and receiver according to one embodiment.

FIG. 8 illustrates one such partial mapping 800 of retransmission policies and TID and DSCP values between a transmitter and receiver according to one embodiment. For example, a DSCP value 23 in combination with TID 4 may designate a Block Ack with 2 retries retransmission policy, and a DSCP value 23 in combination with TID 5 may designate a Block Ack with 5 retries retransmission policy, and so on. Each DSCP value 0-63 in combination with TID values 4 and 5 may designate a different retransmission policy. In other embodiments, each DSCP value 0-63 in combination with TID values 0-7 may designate different retransmission policies. Thus, based on the DSCP value, the transmitting STA determines how many times it will maximally (re)transmit the MPDU 400 that carries the packet. In some embodiments, multiple DSCP values may map to the same TID, but the transmitter may internally decide whether to retransmit a certain MPDU 400 or not, based on the DSCP value. Thus, in some embodiments, the maximum number of retransmissions may vary with the TID value.

In another embodiment, the source STA 102 desires to transmit video and/or audio data streams to the destination STA 108 using EDCA. The source STA 102 assigns each MPDU comprising the data stream a TID value between 0-15. However, in this embodiment, the TID field 510 value of an MPDU 400 may not necessarily be related to the priority given the MPDU 400 by the receiver (e.g., AP 104). In other words, the TID value (User Priority 0-7 or TSID 8-15) assigned to the TID field 510 may be unrelated to the actual Access Category given to the MPDU 400 by the receiver. This embodiment may therefore overrule the fixed EDCA mapping illustrated in FIG. 7. Where HCCA is not used between the transmitter and receiver, this embodiment also makes use of the TID values 8-15 which would otherwise go unused. Thus, in one embodiment, each TID value may have a fixed Acknowledgment retransmission Policy, but since the video stream may be split over multiple TIDs based on different DSCP values, different layers in the video stream will receive a different Acknowledgment Policy when transmitted over the WLAN.

FIG. 9 illustrates one example of an alternative mapping 900 between TID 510 values and the priority and Access Category given at the receiver (e.g., AP 104). For example, a TID 510 value of 12 may actually signify a User Priority value of 5 and an access category AC_VI. Since retransmission policies may be directly tied to the TID field 510 value of an MPDU 400, the source STA 102 may now have at least 16 different retransmission policies to assign a given MPDU 400 while at the same time maintaining the desired priority given to the MPDU. In some embodiments, the amount of retransmission policies available for a given MPDU may be significantly increased by also using the DSCP field 306 value of the MPDUs to represent a unique retransmission policy (similar to the concept described above in reference to FIG. 8) in combination with the alternative mapping scheme.

Ordinarily the Sequence Number within the Sequence Control field 406 of an MPDU 400 is assigned using the counter identified by the TID subfield 510 of the QoS Control field 408, and that counter is incremented by one for each MPDU 400 belonging to that TID value. Thus, three consecutive MPDUs in a stream having the same TID value should have consecutive sequence numbers, whereas three consecutive MPDUs in a stream having different TID values may have nonconsecutive, unrelated sequence numbers.

In some of the embodiments described herein, however, the sequence numbers assigned to the MPDUs can be made independent to the TID value assigned to those MPDUs. Thus, three consecutive MPDUs in a stream may have consecutive sequence numbers even though they have different TID values. The sequence numbers may be assigned based on the mapped Access Category the TID value actually points to rather than the TID value itself. Using the alternative mapping shown in FIG. 9 as an example, three consecutive MPDUs in a stream having TID values 5, 13, and 15, respectively, may have consecutive sequence numbers since all map to access category AC_IV.

Since such an embodiment departs from the traditional EDCA mapping, all devices in the WLAN using such an alternative mapping (e.g., source STA 102, first AP 104, second AP 106, and/or destination STA 108) must have advanced knowledge of the alternative mapping scheme before it can be used. Therefore, negotiation of information related to the alternative mappings should be communicated between the transmitter and the receiver (e.g., between the source STA 102 and first AP 104 and/or the second AP 106 and destination STA 108). In one embodiment, the alternative mapping scheme may be transmitted to the receiver from the source STA 102 during an initiation message. In another embodiment, the AP 104 may broadcast the mapping to the source STA 102 through an association response frame.

In another embodiment, the source STA 102 desires to transmit video and/or audio data streams to the destination STA 108 using EDCA. In this embodiment, the last access point wirelessly linked to the destination STA 108 in the chain, for example second AP 106 in FIG. 1, utilizes the DSCP field 306 values of the MPDUs 400 it receives to overwrite the existing TID values 510 of the MPDUs 400. This embodiment does not necessarily require other access points that come before the second AP 106 in the chain, namely the first AP 104, to have advance knowledge of any alternative Access Category mappings.

For example, each MPDU 400 comprising the data stream may be assigned a TID value of, for example, 4 or 5 at the source STA 102 if the data stream is a video stream. In one embodiment, the data stream may be a video stream having a layered modulation scheme. The application that generates the data stream may assign specific DSCP field 306 values to the MPDUs based on the specific video encoding layer (e.g., I-frame, P-frame, or B-frame, etc.) that the MPDU belongs to. In this fashion, the DSCP fields 306 can be used by the last access point in the chain (e.g., AP 106) to reconfigure the TID values on the final transmission to the destination STA 108.

In one embodiment, the MPDUs 400 comprising the data stream are first transmitted from the source STA 102 to the first AP 104. The first AP 104 handles the MPDUs 400 according to priorities and retransmission policies set by the TID values, for example values 4 or 5, and retransmits the data stream to the second AP 106 accordingly.

Next, the MPDU 400 data stream may be transmitted from the second AP 106 to the destination STA 108. Notably, the TID field 510 values of the MPDUs 400 during this transmission to the destination STA 108 are not used to determine priority treatment of the MPDUs 400 for any further transmissions beyond the destination STA 108 because the destination STA 108 is the final point of the transmission. Thus, the TID field 510 values of the MPDUs 400 during this transmission to the destination STA 108 are used primarily to determine sequence number reordering and the retransmission policy of the MPDUs 400. Therefore, the second AP 106 may freely rewrite and override the TID field 510 values of the MPDUs because the MPDUs will not be retransmitted to subsequent destinations beyond the destination STA 108.

Figure 10:
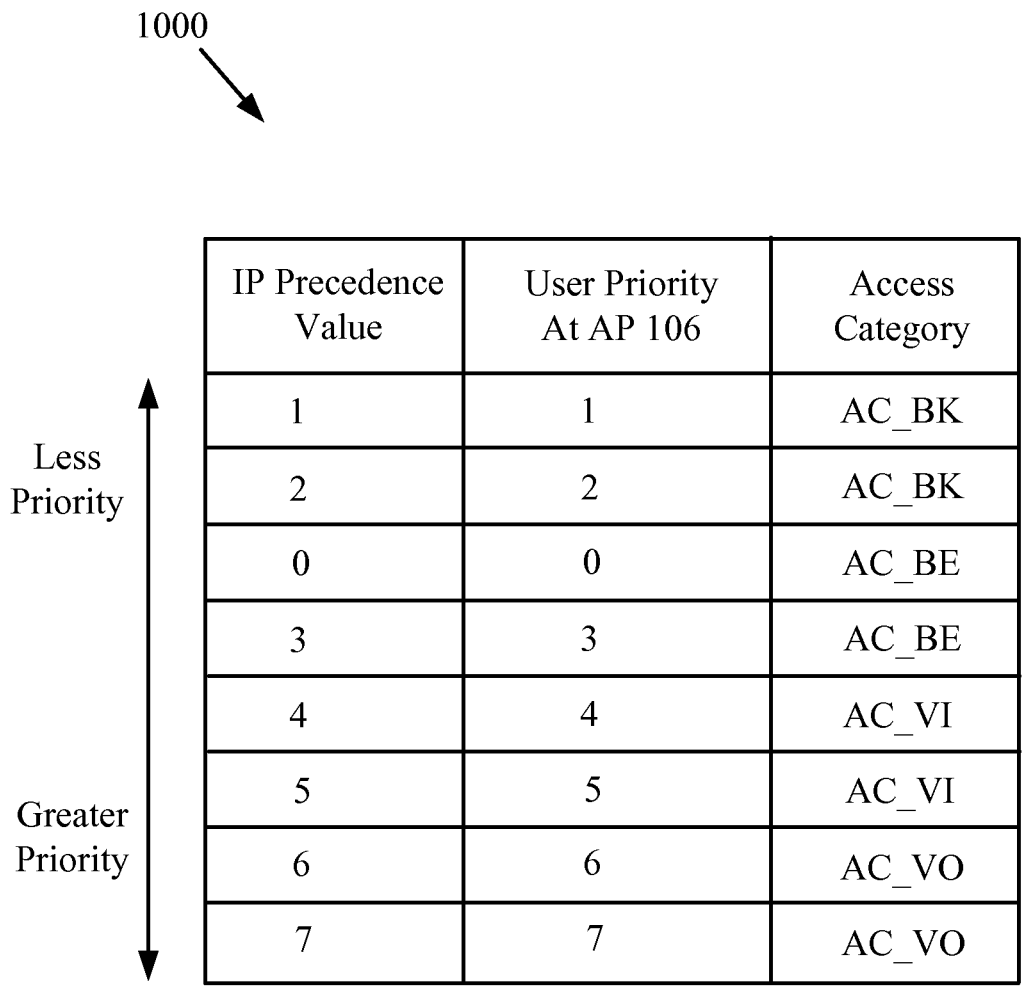
FIG. 10 illustrates a mapping of the IP Precedence values of a Differentiated Services Code Point (DSCP) field that correspond to the User Priority values along with the associated Access Categories according to one embodiment.

In one example, the second AP 106 rewrites the TID field 510 values based on the values it reads from the IP Precedence portion and non-IP Precedence portion of the DSCP field 306 values. As previously discussed, the IP Precedence portion is the three least significant bits of the 6 bit DSCP field 306, and the non-IP Precedence portion is the three most significant bits of the 6 bit DSCP field 306. The second AP 106 prioritizes a given MPDU 400 for transmission to the destination STA 108 based on the value contained in the IP Precedence portion of the DSCP field 306 of that MPDU 400 based on, for example, the mapping 1000 shown in FIG. 10. Thus, the second AP 106 prioritizes the MPDU 400 for transmission to the destination STA 108 by interpreting the IP Precedence portion of the DSCP value 306 as a User Priority value. A User Priority value is associated with an Access Category value as shown, for example, in FIG. 10.

The second AP 106 also rewrites the TID field 510 value of the MPDU 400 with the value contained in the non-IP Precedence portion of the DSCP field 306. Thus, the retransmission policy of the MPDU 400 may now be changed depending on the value rewritten to the TID field 510 value since the retransmission policy of an MPDU 400 may be linked to the TID field 510 value. The destination STA 108 reorders the MPDUs 400 received based on the sequence number counter which is determined by the new TID field 510 value. In one embodiment, the MPDUs/packets can be reordered across the various video encoding layers which may be determined by the DSCP values.

In the above example, the values written to the TID fields 510 and the Access Categories assigned to the MPDUs 400 by the second AP 106 all stem from the DSCP field 306 values that may have been originally selected by the application that generated the IP packets based on the layered video data. In one embodiment, the application may be resident at the source STA 102, for example, within a memory circuit at the source STA 102, and executed by a processing circuit at the source STA 102. In other embodiments, another device generates the IP packets based on the layered video data.

Figure 11:
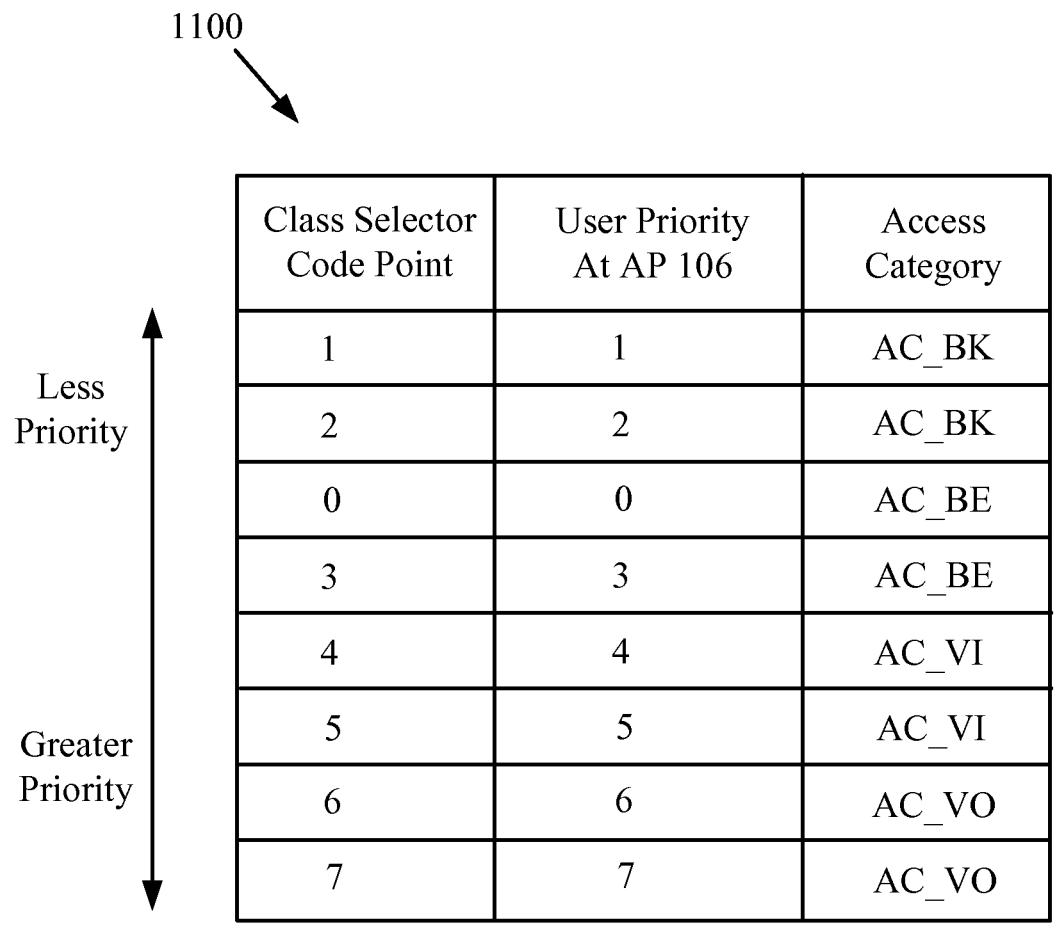
FIG. 11 illustrates a mapping of Class Selector Code Point values that correspond to the User Priority values along with the associated Access Categories according to one embodiment.

In another example, the second AP 106 rewrites the TID field 510 values based on whether the DSCP field 306 value of an MPDU 400 contains a Class Selector Code Point value or a Non-class Selector Code Point value. If the DSCP field 306 contains a Class Selector Code Point value (i.e., value between 0-7) the second AP 106 prioritizes the MPDU 400 for transmission to the destination STA 108 based on this value by interpreting it as a User Priority value. The User Priority value corresponds to the Access Category as shown in the mapping 1100 illustrated in FIG. 11. Moreover, the second AP 106 may rewrite the TID field 510 value of the MPDU 400 with the value contained in the IP Precedence portion of the DSCP field 306. The TID value rewritten to the TID field 510 of the MPDU 400 may dictate the retransmission policy of that particular MPDU 400 as well as what sequence number counter will be used to reorder the MPDU 400.

By contrast, if the DSCP field 306 contains a Non-class Selector Code Point value (i.e., value between 8-63) the second AP 106 may both prioritize the MPDU 400 and rewrite the TID field 510 value according to any preselected mapping governed by the Non-class Selector Code Point value. For example, FIG. 12 illustrates such a partial mapping 1200 between the Non-Class Selector Code Point value, the Access Category value, and the TID value assigned/rewritten to the MPDU 400. The TID value rewritten to the TID field 510 of the MPDU 400 may dictate the retransmission policy of that particular MPDU 400 as well as what sequence number counter will be used to reorder the MPDU 400. Thus, for example, a Non-class Selector Code Point value of 13 may cause the second AP 106 to rewrite the TID field 510 value with a value of 5 that corresponds to a retransmission policy having Block Acknowledgment with 2 retry attempts. The priority assigned to the MPDU 400 will also be governed according to the Access Category AC_VI. The partial mapping 1200 shown in FIG. 12 is merely one example. Any preselected mapping may be used where various Non-class Selector Code Point values correspond to different priority and retransmission policies.

In another example, the second AP 106 rewrites the TID field 510 values based on whether the DSCP field 306 value of an MPDU 400 contains a Class Selector Code Point value or a Non-class Selector Code Point value. If the DSCP field 306 contains a Class Selector Code Point value (i.e., value between 0-7) the second AP 106 prioritizes the MPDU 400 for transmission to the destination STA 108 based on this value by interpreting it as a User Priority value. The User Priority value corresponds to the Access Category as shown in the mapping 1100 illustrated in FIG. 11. Moreover, the second AP 106 may rewrite the TID field 510 value of the MPDU 400 with the value contained in the IP Precedence portion of the DSCP field 306. The TID value rewritten to the TID field 510 of the MPDU 400 may dictate the retransmission policy of that particular MPDU 400 as well as what sequence number counter will be used to reorder the MPDU 400.

By contrast, if the DSCP field 306 contains a Non-class Selector Code Point value (i.e., value between 8-63) the second AP 106 rewrites the TID field 510 value of the MPDUs 400 based on the values it reads from the IP Precedence portion and non-IP Precedence portion of the DSCP field 306 values. The second AP 106 prioritizes a given MPDU 400 for transmission to the destination STA 108 based on the value contained in the IP Precedence portion of the DSCP field 306, for example, as shown in the mapping 1000 of FIG. 10. Thus, the second AP 106 prioritizes the MPDU 400 for transmission to the destination STA 108 by interpreting the IP Precedence portion of the DSCP value 306 as a User Priority value. A User Priority value is associated with an Access Category value as shown, for example, in FIG. 10. The second AP 106 rewrites the TID field 510 value of the MPDU 400 with the value contained in the non-IP Precedence portion of the DSCP field 306. Thus, the retransmission policy of the MPDU 400 may now be changed depending on the value rewritten to the TID field 510 value since the retransmission policy of an MPDU 400 may be linked to the TID field 510 value. The destination STA 108 reorders the MPDUs 400 received based on the sequence number counter which is determined by the new TID field 510 value. In one embodiment, the MPDUs/packets can be reordered across the various video encoding layers which may be determined by the DSCP values.

Figure 13:
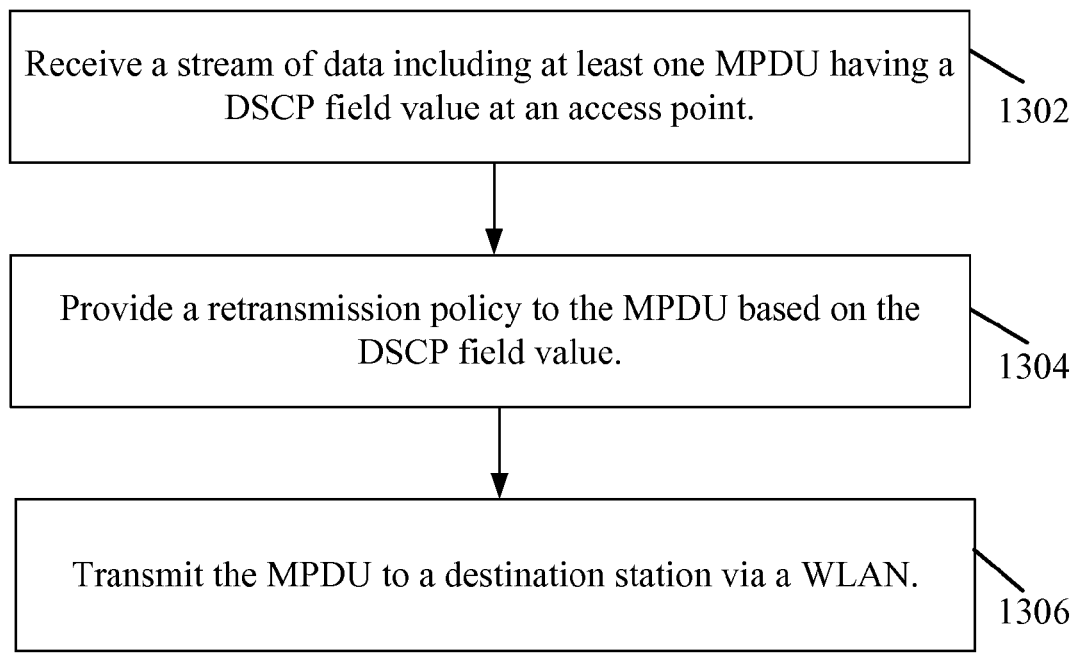
FIG. 13 is a flowchart illustrating an exemplary method operational at an access point for providing multiple retransmission policies to a data stream that is transmitted to a receiving station according to one embodiment.

FIG. 13 is a flowchart illustrating an exemplary method operational at an access point, for example the second AP 106, for providing multiple retransmission policies to a data stream that is transmitted to a receiving station, such as the destination STA 108. At step 1302, the access point receives a stream of data including at least one MPDU 400 having a DSCP field 306 value. The stream of data may be received from a prior access point such as the first AP 104 or the source STA 102. At step 1304, the access point 106 provides a retransmission policy to the MPDU 400 based on the DSCP field 306 value. For example, this can be performed by retrieving the DSCP field 306 value using deep packet inspection and rewriting/replacing the original TID field 510 value (e.g., first TID field value) with a new TID field 510 value (e.g., second TID field 510 value) that is based at least in part on the DSCP field 306 value where the second TID field 510 value determines the retransmission policy of the MPDU 400. At step 1306, the access point 106 transmits the MPDU 400 to the destination STA 108 according to the retransmission policy based at least in part on the DSCP field 306 value of the MPDU 400.

Figure 14:
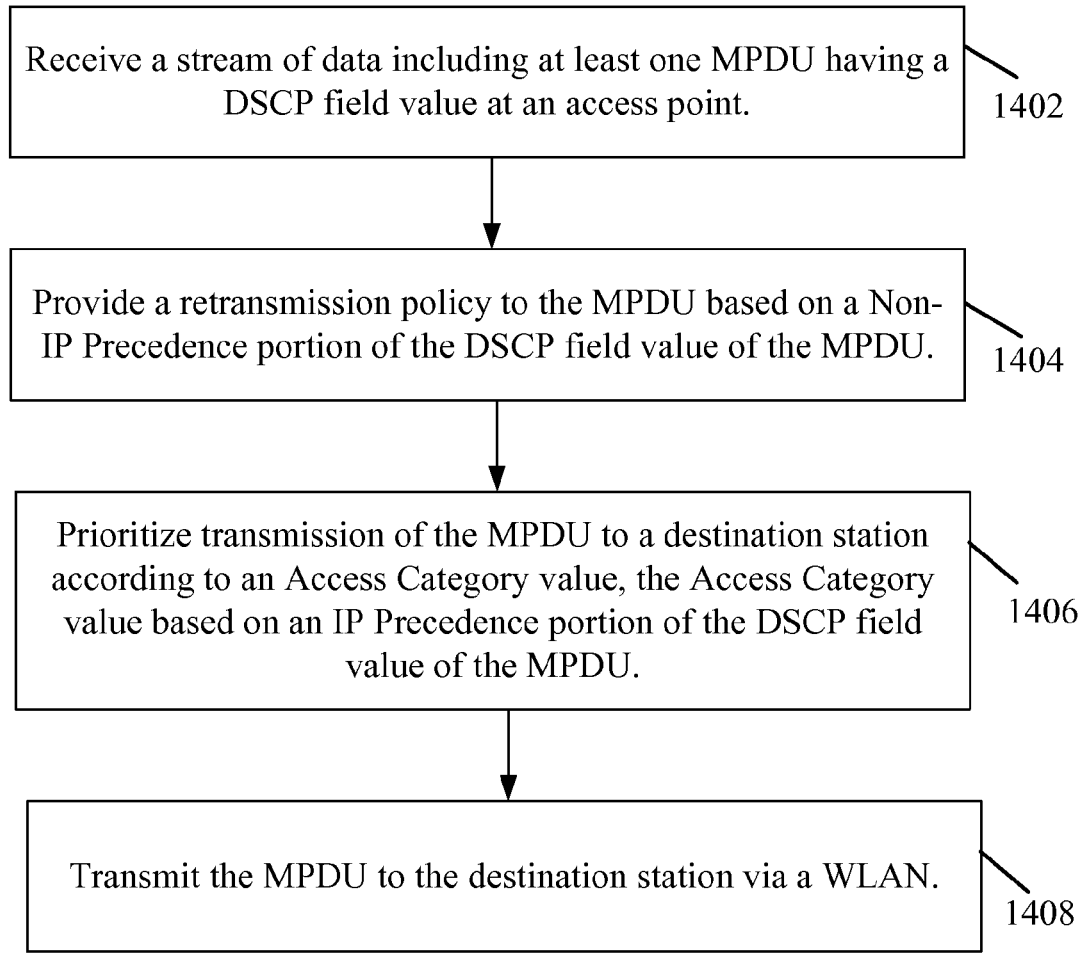
FIG. 14 is a flowchart illustrating an exemplary method operational at an access point for providing multiple retransmission policies to a data stream that is transmitted to a receiving station according to one embodiment.

FIG. 14 is a flowchart illustrating an exemplary method operational at an access point, for example the second AP 106, for providing multiple retransmission policies to a data stream that is transmitted to a receiving station, such as the destination STA 108. At step 1402, the access point receives a stream of data including at least one MPDU 400 having a DSCP field 306 value. The stream of data may be received from a prior access point such as the first AP 104 or the source STA 102. At step 1404, the access point 106 provides a retransmission policy to the MPDU 400 based on a Non-IP Precedence portion of the DSCP field 306 value of the MPDU 400. For example, this can be performed by retrieving the DSCP field 306 value using deep packet inspection and rewriting/replacing the original TID field 510 value (e.g., first TID field value) with a new TID field 510 value (e.g., second TID field 510 value) that is based at least in part on the Non-IP Precedence portion of the DSCP field 306 value. The second TID field 510 value determines the retransmission policy of the MPDU 400. At step 1406, the access point 106 prioritizes transmission of the MPDU 400 to the destination station 108 according to an Access Category value, where the Access Category value is based on an IP Precedence portion of the DSCP field 306 value of the MPDU 400. At step 1408, the access point 106 transmits the MPDU 400 to the destination STA 108 according to the retransmission policy based at least in part on the Non-IP Precedence portion of the DSCP field 306 value.

Figure 15:
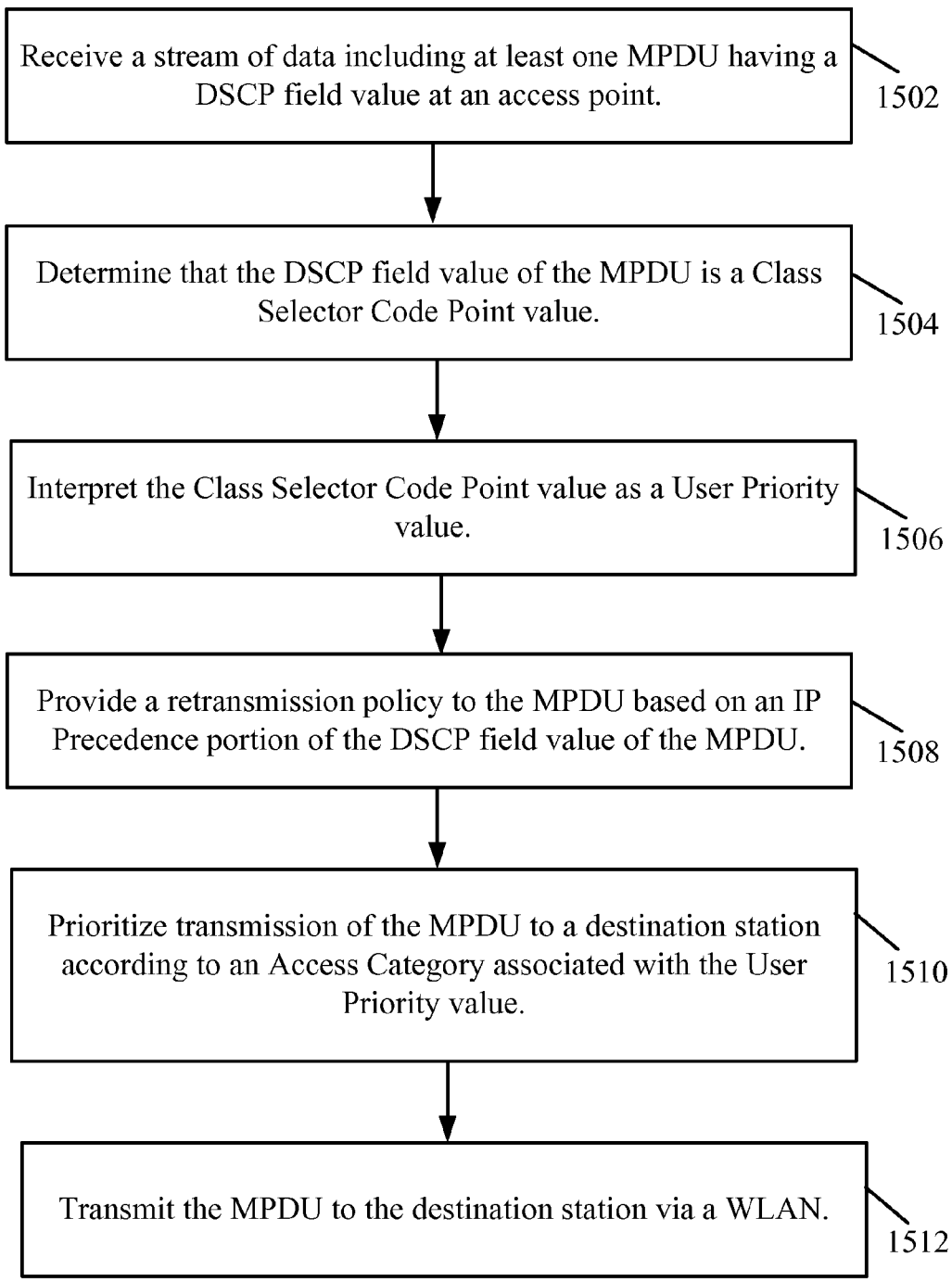
FIG. 15 is a flowchart illustrating an exemplary method operational at an access point for providing multiple retransmission policies to a data stream that is transmitted to a receiving station according to one embodiment.

FIG. 15 is a flowchart illustrating an exemplary method operational at an access point, for example the second AP 106, for providing multiple retransmission policies to a data stream that is transmitted to a receiving station, such as the destination STA 108. At step 1502, the access point receives a stream of data including at least one MPDU 400 having a DSCP field 306 value. The stream of data may be received from a prior access point such as the first AP 104 or the source STA 102. At step 1504, the access point 106 determines that the DSCP field value of the MPDU is a Class Selector Code Point value and, at step 1506, it interprets the Class Selector Code Point value as a User Priority value. At step 1508, the access point 106 provides a retransmission policy for the MPDU 400 based on an IP Precedence portion of the DSCP field 306 value of the MPDU 400. For example, this can be performed by retrieving the DSCP field 306 value using deep packet inspection and rewriting/replacing the original TID field 510 value (e.g., first TID field value) with a new TID field 510 value (e.g., second TID field 510 value) that is based at least in part on the IP Precedence portion of the DSCP field 306 value. The second TID field 510 value determines the retransmission policy of the MPDU 400. At step 1510, the access point 106 prioritizes transmission of the MPDU to the destination station 108 according to an Access Category associated with the User Priority value. At step 1512, the access point 106 transmits the MPDU 400 to the destination STA 108 according to the retransmission policy based at least in part on the IP Precedence portion of the DSCP field 306 value of the MPDU 400.

Figure 16:
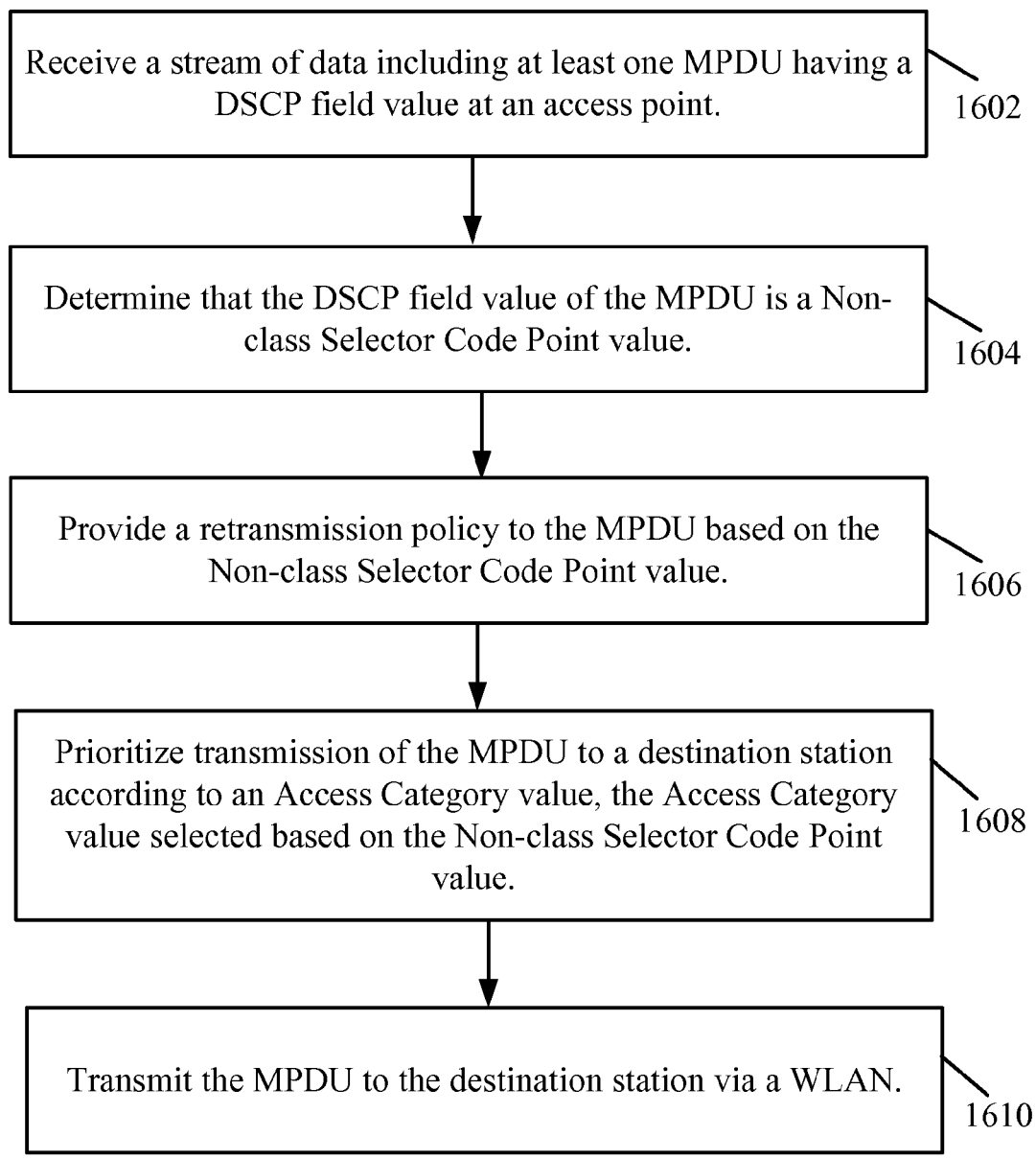
FIG. 16 is a flowchart illustrating an exemplary method operational at an access point for providing multiple retransmission policies to a data stream that is transmitted to a receiving station according to one embodiment.

FIG. 16 is a flowchart illustrating an exemplary method operational at an access point, for example the second AP 106, for providing multiple retransmission policies to a data stream that is transmitted to a receiving station, such as the destination STA 108. At step 1602, the access point receives a stream of data including at least one MPDU 400 having a DSCP field 306 value. The stream of data may be received from a prior access point such as the first AP 104 or the source STA 102. At step 1604, the access point 106 determines that the DSCP field value of the MPDU is a Non-class Selector Code Point value. At step 1606, the access point 106 provides a retransmission policy for the MPDU 400 based at least in part on the Non-class Selector Code Point value. For example, this can be performed by retrieving the DSCP field 306 value using deep packet inspection and rewriting/replacing the original TID field 510 value (e.g., first TID field value) with a new TID field 510 value (e.g., second TID field 510 value) that is based at least in part on the Non-class Selector Code Point value. The second TID field 510 value determines the retransmission policy of the MPDU 400. At step 1608, the access point 106 prioritizes transmission of the MPDU 400 to the destination station 108 according to an Access Category value, where the Access Category value is selected based on the Non-class Selector Code Point value. At step 1610, the access point 106 transmits the MPDU 400 to the destination STA 108 according to the retransmission policy based at least in part on the Non-class Selector Code Point value.

Figure 17:
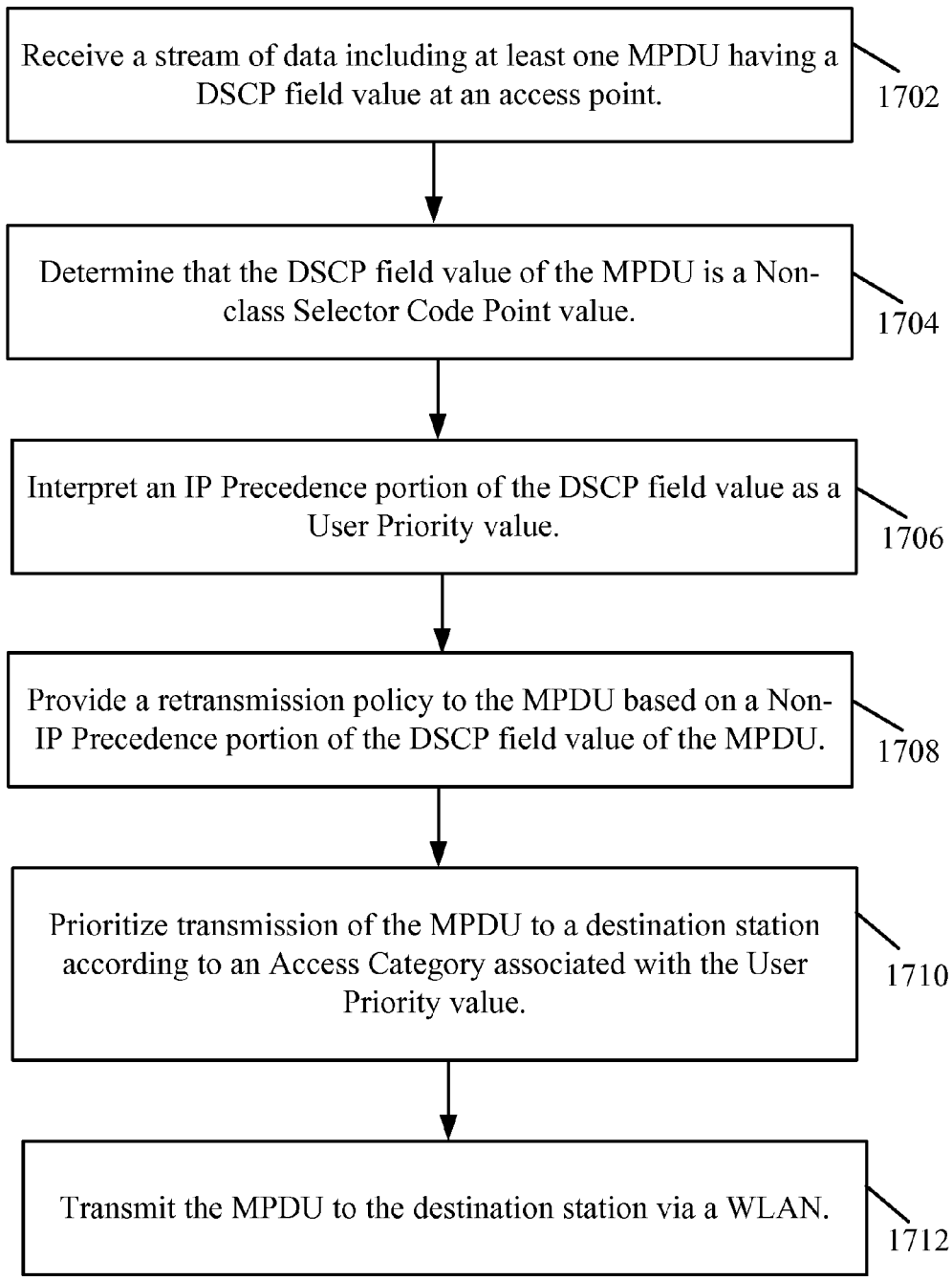
FIG. 17 is a flowchart illustrating an exemplary method operational at an access point for providing multiple retransmission policies to a data stream that is transmitted to a receiving station according to one embodiment.

FIG. 17 is a flowchart illustrating an exemplary method operational at an access point, for example the second AP 106, for providing multiple retransmission policies to a data stream that is transmitted to a receiving station, such as the destination STA 108. At step 1702, the access point receives a stream of data including at least one MPDU 400 having a DSCP field 306 value. The stream of data may be received from a prior access point such as the first AP 104 or the source STA 102. At step 1704, the access point 106 determines that the DSCP field 306 value of the MPDU 400 is a Non-class Selector Code Point value and, at step 1706, it interprets an IP Precedence portion of the DSCP field 306 value as a User Priority value. At step 1708, the access point 106 provides a retransmission policy for the MPDU 400 based on a Non-IP Precedence portion of the DSCP field 306 value of the MPDU. For example, this can be performed by retrieving the DSCP field 306 value using deep packet inspection and rewriting/replacing the original TID field 510 value (e.g., first TID field value) with a new TID field 510 value (e.g., second TID field 510 value) that is based at least in part on the Non-IP Precedence portion of the DSCP field 306 value of the MPDU 400. The second TID field 510 value determines the retransmission policy of the MPDU 400. At step 1710, the access point 106 prioritizes transmission of the MPDU 400 to the destination station 108 according to an Access Category associated with the User Priority value. At step 1712, the access point 106 transmits the MPDU 400 to the destination STA 108 according to the retransmission policy based at least in part on the Non-IP Precedence portion of the DSCP field 306 value of the MPDU 400.

In some embodiments, the second TID field 510 value may have a value between 8 and 15 when HCCA is disabled between the access point 106 and destination STA 108. Thus, the second TID field 510 can take on values that are normally reserved for HCCA uses and ECDA is enabled between the access point and the destination STA 108. In other embodiments, the stream of data received at the access point 106 includes a stream of video and/or audio data having a layered modulation scheme, and the DSCP field 306 value of the MPDU 400 identifies at least one layer of the layered modulation scheme with which the MPDU 400 is associated.

Exemplary Access Point

Figure 18:
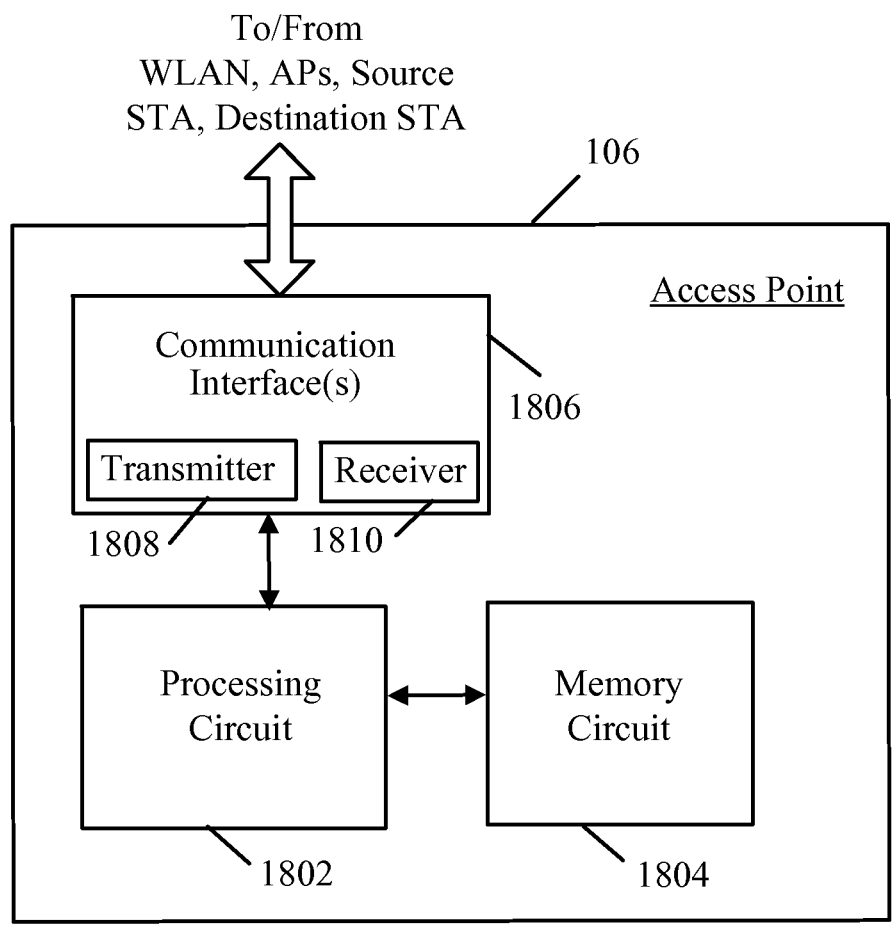
FIG. 18 illustrates a functional block diagram of an access point according to one embodiment.

FIG. 18 illustrates a functional block diagram of the second access point 106 according to one embodiment. The second access point 106 may comprise a processing circuit 1802 (e.g., processor, processing module, etc.), a memory circuit 1804 (e.g., memory, memory modules, etc.), and a communication interface(s) 1806, all of which may be communicatively coupled to each other. The communication interface(s) 1806 may further comprise at least one transmitter 1808 and at least one receiver 1810 that allow for wireless and/or wire line communication with the WLAN 100, other access points (e.g., access point 104), source STA 102, and/or destination STA 108.

The processing circuit 1802 is configured to process data. Specifically, the processing circuit is adapted to perform any of, and at least: steps 1302, 1304, and 1306 illustrated in FIG. 13; steps 1402, 1404, 1406, and 1408 illustrated in FIG. 14; steps 1502, 1504, 1506, 1508, 1510, and 1512 illustrated in FIG. 15; steps 1602, 1604, 1606, 1608, and 1610 illustrated in FIG. 16; and/or steps 1702, 1704, 1706, 1708, 1710, and 1712 illustrated in FIG. 17. For example, the processing circuit is adapted to process a stream of MPDUs 400 having specific DSCP field 306 values indicative of the specific video encoding layer (e.g., I-frame, P-frame, or B-frame, etc.) that the MPDU 400 is associated with. In this fashion, the DSCP fields 306 can be used by the processing circuit 1802 to reconfigure the TID field 510 values before transmission of the MPDU 400 data stream to the destination STA 108.

The memory circuit 1804 is configured to store data, including mappings between DSCP field 306 values retrieved from MPDUs of a data stream and their corresponding replacement TID field 510 values, retransmission policies, and Access Category/priority values. For example, the memory circuit 1804 may store mappings similar to those depicted in mappings 700, 800, 900, 1000, 1100, and 1200. The memory circuit 1804 is also configured to store data streams including video and/or audio data streams having layered modulation schemes. The communication interface(s) 1806 is configured to receive and transmit data to other network (WLAN) components, such as the reception and transmission of a stream of data including at least one MPDU having a DSCP field value. The first access point 104 may have identical structural elements that perform the same functions as the second access point 106.

Exemplary Source Station

Figure 19:
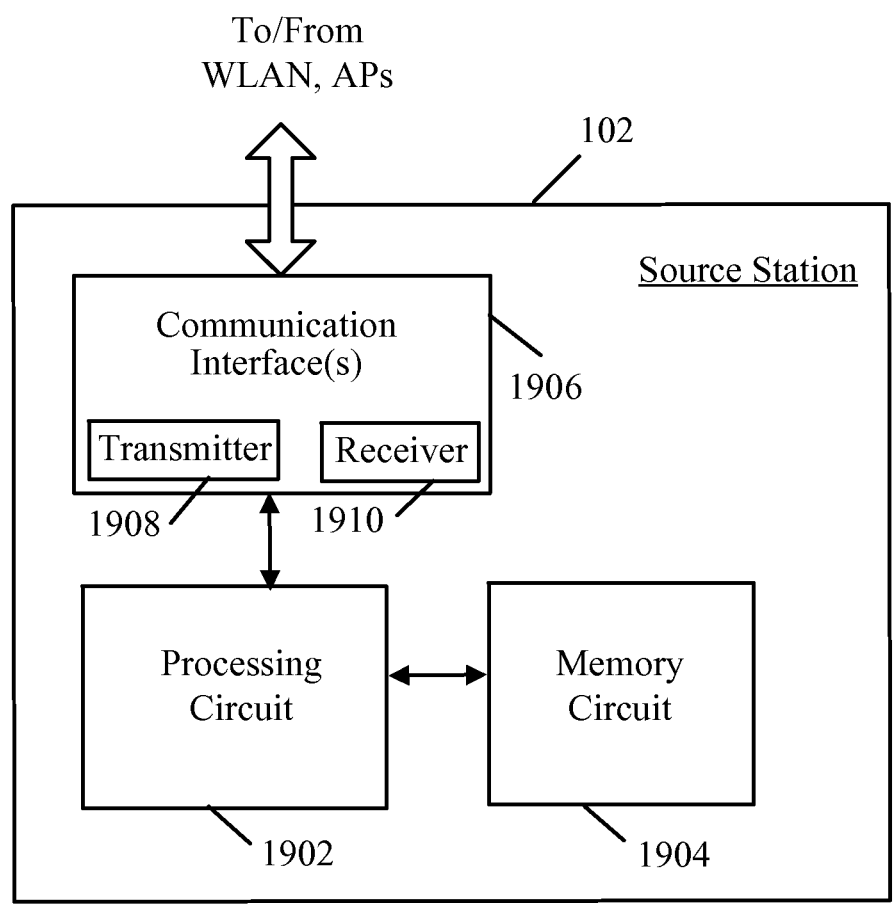
FIG. 19 illustrates a functional block diagram of a source STA according to one embodiment.

FIG. 19 illustrates a functional block diagram of the source STA 102 according to one embodiment. The source STA 102 may comprise a processing circuit 1902 (e.g., processor, processing module, etc.), a memory circuit 1904 (e.g., memory, memory modules, etc.), and a communication interface(s) 1906, all of which may be communicatively coupled to each other. The communication interface(s) 1906 may further comprise at least one transmitter 1908 and at least one receiver 1910 that allow for wireless and/or wire line communication with the WLAN 100, the APs 104, 106, and/or the destination STA 108.

The processing circuit 1902 is configured to process and/or generate data streams including video and/or audio data streams having layered modulation schemes. The memory circuit 1904 is configured to store data, including video and/or audio data streams having layered modulation schemes. The memory circuit 1904 may also be configured to store an application/instructions which when executed by the processor 1904 generates a stream of MPDUs 400 having specific DSCP field 306 values indicative of the specific video encoding layer (e.g., I-frame, P-frame, or B-frame, etc.) that the MPDU 400 is associated with. In this fashion, the DSCP fields 306 can be used by the last access point in the chain (e.g., AP 106) to reconfigure the TID field 510 values of the MPDU 400 data stream on the final transmission to the destination STA 108. The communication interface(s) 1906 is configured to receive and transmit data, such as the reception and transmission of a stream of data including at least one MPDU having a DSCP field value, to other WLAN 100 components including the first AP 104, the second AP 106, and/or the destination STA 108.

Exemplary Destination Station

Figure 20:
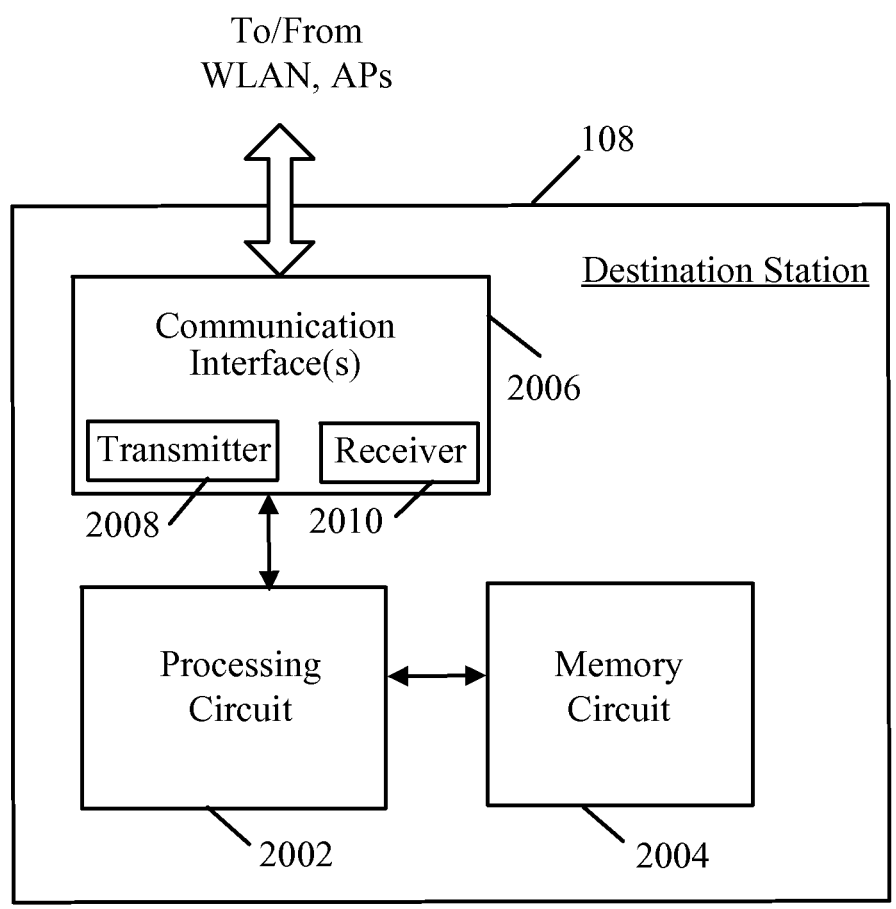
FIG. 20 illustrates a functional block diagram of a destination STA according to one embodiment.

FIG. 20 illustrates a functional block diagram of the destination STA 108 according to one embodiment. The destination STA 108 may comprise a processing circuit 2002 (e.g., processor, processing module, etc.), a memory circuit 2004 (e.g., memory, memory modules, etc.), and a communication interface(s) 2006, all of which may be communicatively coupled to each other. The communication interface(s) 2006 may further comprise at least one transmitter 2008 and at least one receiver 2010 that allow for wireless and/or wire line communication with the WLAN 100, the APs 104, 106, and/or the source STA 102.

The processing circuit 2002 is configured to receive and process data streams including video and/or audio data streams having layered modulation schemes. Moreover, the processing circuit 2002 is configured to receive and process MPDUs 400 having specific DSCP field 306 values indicative of the specific video encoding layer (e.g., I-frame, P-frame, or B-frame, etc.) that the MPDU 400 is associated with. The memory circuit 2004 is configured to store data, including video and/or audio data streams having layered modulation schemes. The memory circuit 2004 may also be configured to a stream of MPDUs 400 having specific DSCP field 306 values indicative of the specific video encoding layer (e.g., I-frame, P-frame, or B-frame, etc.) that the MPDU 400 is associated with. In this fashion, the destination STA 108 receives (via communication interface(s) 2006), stores (in memory circuit 2004), and processes (using processing circuit 2002) a data stream including at least one MPDU 400 having a new TID field 510 value and new retransmission policy based on the DSCP field 306 value of the MPDU 400. The communication interface(s) 2006 is configured to receive and transmit data, such as the reception and transmission of a stream of data including at least one MPDU having a DSCP field value, to other WLAN 100 components including the first AP 104, the second AP 106, and the source STA 102.

One or more of the components, steps, features and/or functions illustrated in FIGS. 1, 2, 3, 4, 5, 6, 7, 8, 9, 10, 11, 12, 13, 14, 15, 16, 17, 18, 19, and/or 20 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 18, 19, and/or 20 may be configured to perform one or more of the methods, features, or steps described in FIGS. 13, 14, 15, 16, and/or 17. The apparatus, devices, and/or components illustrated in FIGS. 1, 18, 19, and/or 20 may be configured to generate, receive, and/or utilize one or more of the tables, mappings, or MPDUs/packets described in FIGS. 3, 4, 5, 6, 7, 8, 9, 10, 11, 12, 13, 14, 15, 16, and/or 17. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at an access point in communication with a destination station, the method comprising:
   receiving a stream of data including at least one media access control protocol data unit (MPDU) having a Differentiated Services Code Point (DSCP) field value, wherein the stream of data has a layered modulation scheme, the DSCP field value of the MPDU identifying at least one layer of the layered modulation scheme;
   providing a retransmission policy to the MPDU based on the DSCP field value by replacing a first Traffic Identifier (TID) field value with a second TID field value, wherein the retransmission policy identifies a maximum number of retransmissions of the MPDU to the destination station; and
   transmitting the MPDU to the destination station via a wireless local area network (WLAN).

2. The method of claim 1, wherein the stream of data includes a stream of video data having a layered modulation scheme, the DSCP field value of the MPDU identifying at least one layer of the layered modulation scheme.

3. The method of claim 1, wherein the maximum number of retransmissions varies based on the second TID field value.

4. The method of claim 1, further comprising:
   performing deep packet inspection to retrieve the DSCP field value of the MPDU and provide the retransmission policy to the MPDU.

5. The method of claim 1, further comprising:
   prioritizing the transmission of the MPDU to the destination station according to an Access Category value, the Access Category value based on an IP Precedence portion of the DSCP field value of the MPDU.

6. The method of claim 1, further comprising:
   providing the retransmission policy to the MPDU based on a Non-IP Precedence portion of the DSCP field value of the MPDU.

7. The method of claim 1, further comprising:
   determining that the DSCP field value of the MPDU is a Class Selector Code Point value;
   interpreting the Class Selector Code Point value as a User Priority value;
   prioritizing the transmission of the MPDU to the destination station according to an Access Category associated with the User Priority value; and
   providing the retransmission policy to the MPDU based on an IP Precedence portion of the DSCP field value of the MPDU.

8. The method of claim 1, further comprising:
   determining that the DSCP field value of the MPDU is a Non-class Selector Code Point value;
   prioritizing the transmission of the MPDU to the destination station according to an Access Category value, the Access Category value selected based on the Non-class Selector Code Point value; and
   providing the retransmission policy to the MPDU based on the Non-class Selector Code Point value.

9. The method of claim 1, further comprising:
   determining that the DSCP field value of the MPDU is a Non-class Selector Code Point value;
   interpreting an IP Precedence portion of the DSCP field value as a User Priority value;
   prioritizing the transmission of the MPDU to the destination station according to an Access Category associated with the User Priority value; and
   providing the retransmission policy to the MPDU based on a Non-IP Precedence portion of the DSCP field value of the MPDU.

10. The method of claim 1, wherein the MPDU includes the first TID field value, and wherein the second TID field value is based on the DSCP field value.

11. The method of claim 10, wherein the second TID value determines the retransmission policy of the MPDU.

12. The method of claim 11, wherein the second TID field value has a value between eight (8) and fifteen (15) when Hybrid Coordination Function Controlled Channel Access (HCCA) is disabled between the access point and the destination station.

13. The method of claim 1, wherein the DSCP field value is associated with a Network Layer and the MPDU is associated with a Data Link Layer.

14. The method of claim 1, wherein the DSCP field value is defined in a payload portion of the MPDU.

15. The method of claim 1, wherein providing the retransmission policy to the MPDU based on the DSCP field value is defined on a per MPDU basis.

16. An access point in communication with a destination station, the access point comprising:
   a wireless communication interface operative to communicate with a wireless local area network (WLAN); and
   a processing circuit coupled to the wireless communication interface and adapted to:
      receive a stream of data including at least one media access control protocol data unit (MPDU) having a Differentiated Services Code Point (DSCP) field value, wherein the stream of data has a layered modulation scheme, the DSCP field value of the MPDU identifying at least one layer of the layered modulation scheme;
      provide a retransmission policy to the MPDU based on the DSCP field value by replacing a first Traffic Identifier (TID) field value with a second TID field value, wherein the retransmission policy identifies a maximum number of retransmissions of the MPDU to the destination station; and
      transmit the MPDU to the destination station via the WLAN.

17. The access point of claim 16, wherein the stream of data includes a stream of video data having a layered modulation scheme, the DSCP field value of the MPDU identifying at least one layer of the layered modulation scheme.

18. The access point of claim 16, wherein the processing circuit is further adapted to:
perform deep packet inspection to retrieve the DSCP field value of the MPDU and provide the retransmission policy to the MPDU.

19. The access point of claim 16, wherein the processing circuit is further adapted to:
prioritize the transmission of the MPDU to the destination station according to an Access Category value, the Access Category value based on an IP Precedence portion of the DSCP field value of the MPDU; and
provide the retransmission policy to the MPDU based on a Non-IP Precedence portion of the DSCP field value of the MPDU.

20. The access point of claim 16, wherein the processing circuit is further adapted to:
determine that the DSCP field value of the MPDU is a Class Selector Code Point value;
interpret the Class Selector Code Point value as a User Priority value;
prioritize the transmission of the MPDU to the destination station according to an Access Category associated with the User Priority value; and
provide the retransmission policy to the MPDU based on an IP Precedence portion of the DSCP field value of the MPDU.

21. The access point of claim 16, wherein the processing circuit is further adapted to:
determine that the DSCP field value of the MPDU is a Non-class Selector Code Point value;
prioritize the transmission of the MPDU to the destination station according to an Access Category value, the Access Category value selected based on the Non-class Selector Code Point value; and
provide the retransmission policy to the MPDU based on the Non-class Selector Code Point value.

22. The access point of claim 16, wherein the processing circuit is further adapted to:
determine that the DSCP field value of the MPDU is a Non-class Selector Code Point value;
interpret an IP Precedence portion of the DSCP field value as a User Priority value;
prioritize the transmission of the MPDU to the destination station according to an Access Category associated with the User Priority value; and
provide the retransmission policy to the MPDU based on a Non-IP Precedence portion of the DSCP field value of the MPDU.

23. An access point in communication with a destination station, the access point comprising:
means for receiving a stream of data including at least one media access control protocol data unit (MPDU) having a Differentiated Services Code Point (DSCP) field value, wherein the stream of data has a layered modulation scheme, the DSCP field value of the MPDU identifying at least one layer of the layered modulation scheme;
means for providing a retransmission policy to the MPDU based on the DSCP field value by replacing a first Traffic Identifier (TID) field value with a second TID field value, wherein the retransmission policy identifies a maximum number of retransmissions of the MPDU to the destination station; and
means for transmitting the MPDU to the destination station via a wireless local area network (WLAN).

24. The access point of claim 23, wherein the stream of data includes a stream of video data having a layered modulation scheme, the DSCP field value of the MPDU identifying at least one layer of the layered modulation scheme.

25. The access point of claim 23, further comprising:
means for performing deep packet inspection to retrieve the DSCP field value of the MPDU and provide the retransmission policy to the MPDU.

26. The access point of claim 23, further comprising:
means for prioritizing the transmission of the MPDU to the destination station according to an Access Category value, the Access Category value based on an IP Precedence portion of the DSCP field value of the MPDU; and
means for providing the retransmission policy to the MPDU based on a Non-IP Precedence portion of the DSCP field value of the MPDU.

27. The access point of claim 23, further comprising:
means for determining that the DSCP field value of the MPDU is a Class Selector Code Point value;
means for interpreting the Class Selector Code Point value as a User Priority value;
means for prioritizing the transmission of the MPDU to the destination station according to an Access Category associated with the User Priority value; and
means for providing the retransmission policy to the MPDU based on an IP Precedence portion of the DSCP field value of the MPDU.

28. The access point of claim 23, further comprising:
means for determining that the DSCP field value of the MPDU is a Non-class Selector Code Point value;
means for prioritizing the transmission of the MPDU to the destination station according to an Access Category value, the Access Category value selected based on the Non-class Selector Code Point value; and
means for providing the retransmission policy to the MPDU based on the Non-class Selector Code Point value.

29. The access point of claim 23, further comprising:
means for determining that the DSCP field value of the MPDU is a Non-class Selector Code Point value;
means for interpreting an IP Precedence portion of the DSCP field value as a User Priority value;
means for prioritizing the transmission of the MPDU to the destination station according to an Access Category associated with the User Priority value; and
means for providing the retransmission policy to the MPDU based on a Non-IP Precedence portion of the DSCP field value of the MPDU.

30. A non-transitory processor-readable medium having one or more instructions operational at an access point in communication with a destination station, which when executed by at least one processor causes the processor to:
receive a stream of data including at least one media access control protocol data unit (MPDU) having a Differentiated Services Code Point (DSCP) field value, wherein the stream of data has a layered modulation scheme, the DSCP field value of the MPDU identifying at least one layer of the layered modulation scheme;
provide a retransmission policy to the MPDU based on the DSCP field value by replacing a first Traffic Identifier (TID) field value with a second TID field value, wherein the retransmission policy identifies a maximum number of retransmissions of the MPDU to the destination station; and transmit the MPDU to the destination station via a wireless local area network (WLAN).

31. The non-transitory processor-readable medium of claim 30, wherein the stream of data includes a stream of video data having a layered modulation scheme, the DSCP field value of the MPDU identifying at least one layer of the layered modulation scheme.

32. The non-transitory processor-readable medium of claim 30, having further instructions which when executed by the processor causes the processor to:

perform deep packet inspection to retrieve the DSCP field value of the MPDU and provide the retransmission policy to the MPDU.

33. The non-transitory processor-readable medium of claim 30, having further instructions which when executed by the processor causes the processor to:

prioritize the transmission of the MPDU to the destination station according to an Access Category value, the Access Category value based on an IP Precedence portion of the DSCP field value of the MPDU; and provide the retransmission policy to the MPDU based on a Non-IP Precedence portion of the DSCP field value of the MPDU.

34. The non-transitory processor-readable medium of claim 30, having further instructions which when executed by the processor causes the processor to:

determine that the DSCP field value of the MPDU is a Class Selector Code Point value;

interpret the Class Selector Code Point value as a User Priority value;

prioritize the transmission of the MPDU to the destination station according to an Access Category associated with the User Priority value; and provide the retransmission policy to the MPDU based on an IP Precedence portion of the DSCP field value of the MPDU.

35. The non-transitory processor-readable medium of claim 30, having further instructions which when executed by the processor causes the processor to:

determine that the DSCP field value of the MPDU is a Non-class Selector Code Point value;

prioritize the transmission of the MPDU to the destination station according to an Access Category value, the Access Category value selected based on the Non-class Selector Code Point value; and provide the retransmission policy to the MPDU based on the Non-class Selector Code Point value.

36. The non-transitory processor-readable medium of claim 30, having further instructions which when executed by the processor causes the processor to:

determine that the DSCP field value of the MPDU is a Non-class Selector Code Point value;

interpret an IP Precedence portion of the DSCP field value as a User Priority value;

prioritize the transmission of the MPDU to the destination station according to an Access Category associated with the User Priority value; and provide the retransmission policy to the MPDU based on a Non-IP Precedence portion of the DSCP field value of the MPDU.

* * * * *